(12) United States Patent
Wu et al.

(10) Patent No.: US 6,876,159 B1
(45) Date of Patent: Apr. 5, 2005

(54) ELECTRONIC BALLAST SYSTEM FOR EMERGENCY LIGHTING APPLICATIONS

(75) Inventors: Yung-Chun Wu, Kaohsiung (TW); Yu-Kai Chen, Taipei (TW); Tsai-Fu Wu, Chiai (TW); Chin-Hsiung Chang, Taichung (TW)

(73) Assignee: Fego Precision Industrial CO, Ltd., Taichung (TW)

( * ) Notice: Subject to any disclaimer, the term of this patent is extended or adjusted under 35 U.S.C. 154(b) by 0 days.

(21) Appl. No.: 10/722,534

(22) Filed: Nov. 28, 2003

(51) Int. Cl.⁷ .............. H05B 37/02; H05B 41/24
(52) U.S. Cl. .............. 315/291; 315/307; 315/224; 315/209 R; 315/376; 315/312
(58) Field of Search ................. 315/291, 307, 315/209 R, 224, 276, 200 R, 212, 219, 246, 282, 312, 313, 320; H05B 37/02, 41/24

(56) References Cited

U.S. PATENT DOCUMENTS 6,624,599 B1 * 9/2003 Chen et al. ............ 315/291
6,664,743 B2 * 12/2003 Langeslag et al. ...... 315/209 R
2003/0197477 A1 * 10/2003 Hsieh ................ 315/291

* cited by examiner

Primary Examiner—Trinh Vo Dinh
(74) Attorney, Agent, or Firm—Troxell Law Office, PLLC

(57) ABSTRACT

An electronic ballast system with emergency lighting features is presented. Especially, the electronic ballast system is relative to a single-stage converter configuration. The electronic ballast system serves as a regular ballast, a regular/emergency ballast, a battery charger or discharger and a power failure detector, fulfilling emergency lighting features. The single-stage converter used in the ballast is an integration of a bi-directional flyback converter and two half-bridge series-resonant parallel-loaded inverters. Unlike conventional approaches, the rectified and filtered input voltage is directly added to a set of battery voltages in the proposed system, so as to reduce the fabrication cost by simplifying the circuit configuration and the number of active switching elements.

14 Claims, 5 Drawing Sheets

ELECTRONIC BALLAST SYSTEM FOR EMERGENCY LIGHTING APPLICATIONS

BACKGROUND OF THE INVENTION

1. Field of the Invention

The present invention generally relates to an electronic ballast system for emergency lighting applications, and more particularly, to a compact single-stage electronic ballast circuit. The system integrates the features of battery charger/discharger and lamp ballast so as to reduce the fabrication cost and the number of switching elements.

2. Description of the Prior Art

To comply with regulation and safety requirements, emergency lighting equipment becomes indispensable. In the prior art of emergency lighting technique, researchers have presented several viable approaches to emergency lighting applications. There is, however, a common drawback of requiring a complicated converter topology, which might result in the high cost and increasing number of switching elements. Accordingly, a single-stage system integrating plural power converters to reduce the fabrication cost has become a future research tendency.

Please refer to FIG. 1A, which is a commonly used circuit configuration for bi-direction flyback converter serving as either a charger or a discharger. FIG. 1B shows the normal configuration of a half-bridge series-resonant parallel-loaded inverter (SRPLI), in which $V_{c1}=V_{c2}$. For a practical emergency lighting application, the battery voltage $V_B$ in FIG. 1A is usually much lower than the rectified line voltage $V_{dc}$. Thus, to combine the bi-directional flyback converter with SRPLIs, it requires an additional transformer to boost up the battery voltage. The inverter of FIG. 1B also serves as an electronic ballast for lighting. A multi-stage power converter shown as FIG. 2 consists of a regular/emergency ballast 200 including S1 and S2, a bi-directional flyback converter 220 including S3 and S4 and a regular ballast 240 including S5 and S6. FIG. 2 shows the original inverter/charger/discharger converter that has not been modified. This invention will incorporate the multi-stage inverter/charger/discharger converter into a single-stage converter.

Applications of a multi-stage power converter shown in FIG. 2 are undermined due to the requirement of the increased number of switching elements. Such a multi-stage power converter employs a considerable amount of elements, which results in high fabrication cost. Furthermore, the overall power conversion efficiency may also decrease due to the multi-stage conversion. These drawbacks are unacceptable since the modern-day standards require the high efficiency and low cost. Therefore, efforts have been made to provide single-stage converters with multiple functions so as to overcome the foregoing problems.

SUMMARY OF THE INVENTION

Therefore, the present invention has been made to solve such problems in view of the forgoing status and to further provide an electronic ballast system, which is a single-stage electronic ballast with emergency lighting features. The electronic ballast system also includes a regular/emergency lamp set and a plural regular lamp set for lighting. The ballast can function as a regular ballast, a regular/emergency ballast, a battery charger, or discharger, or a power failure detector, so as to fulfill emergency lighting features. The single-stage converter used in the ballast is an integration of a bi-directional flyback converter and two half-bridge series-resonant parallel-loaded inverters. Unlike conventional approaches, the rectified and filtered input voltage is directly added to the battery voltage in the proposed system of this invention, thereby reducing the fabrication cost and the number of active switching elements with the simplified circuit configuration.

In addition, this invention further includes a detector to differentiate the system saturation to simplify circuit design. The detector mainly includes a lamp switch to decide that all the lamps are on or off. There are three modes of system saturation shown as follow:

Mode I: The utility electricity is off, a regular/emergency lamp set is lighting by a set of batteries and a plural regular lamp set is off.

Mode II: The utility electricity is normally on and the lamp switch is turned off, then all the lamps are off so that the regular/emergency lamp is off too.

Mode III: The utility electricity is normally on and the lamp switch is turned on, then all the lamps are on so that the regular/emergency lamp is on too.

Other and further features, advantages and benefits of this invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits and advantages of the preferred embodiment of the present invention will be readily understood by the accompanying drawings and detailed descriptions, wherein.

DETAILED DESCRIPTION OF THE INVENTION

The present invention discloses a single-stage system that integrates a bi-direction flyback converter, a regular ballast inverter and a regular/emergency ballast inverter.

Figure 2:
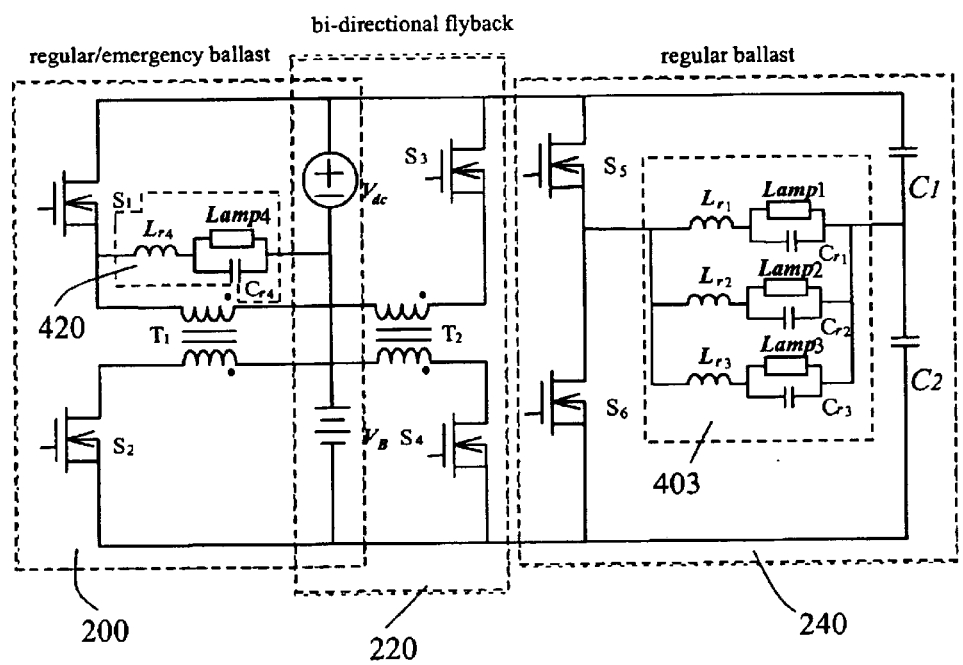
FIG. 2 is a circuit configuration of electronic ballast for emergency lighting applications in the prior art.
Figure 3A:
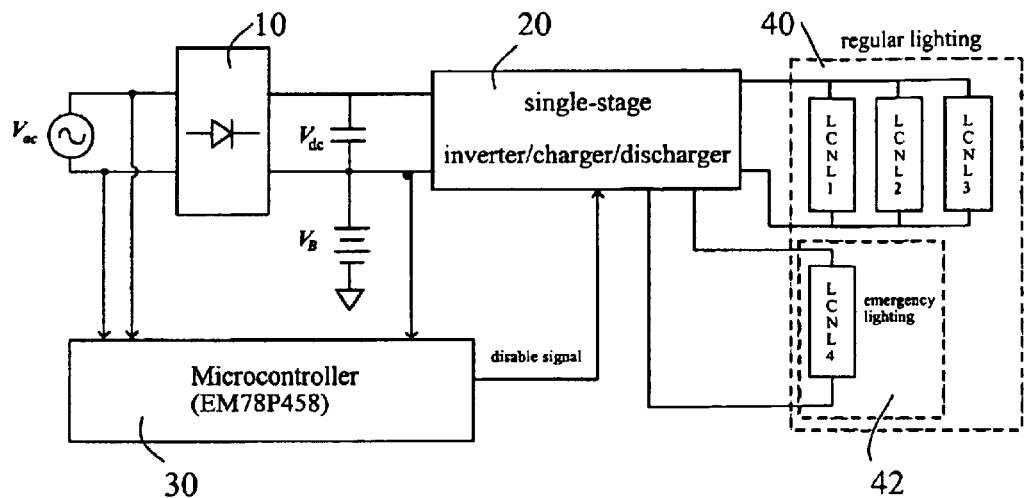
FIG. 3A is a functional block diagram in accordance with the preferred embodiment of the present invention.
Figure 3B:
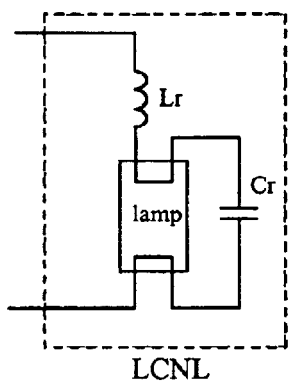
FIG. 3B is a detailed connection of LC network lamp (LCNL) in accordance with FIG. 3A of the present invention.

Please refer to FIG. 3A, which is a functional block diagram of a single-stage electronic ballast system of this invention for emergency lighting applications. As shown in FIG. 3A, an integrated single-stage inverter/charger/discharger converter 20, a microcontroller 30, and four LC networks with lamps (LCNLs) are provided. FIG. 3B shows a schematic diagram of LCNL consisted of an inductor Lr, a lamp and a capacitor Cr. The inductor Lr is connected to the lamp in series. The capacitor Cr is coupled to the lamp in parallel. In FIG. 3A, the four LC networks with lamps include the regular lighting 40 and the emergency lighting 42. According to FIG. 2, the LCNL1 is consisted of the inductor Lr1, the lamp1 and the capacitor Cr1. The LCNL2 is consisted of the inductor Lr2, the lamp2 and the capacitor Cr2. The LCNL3 is consisted of the inductor Lr3, the lamp3 and the capacitor Cr3. Further, the LCNL4 is consisted of the inductor Lr4, the lamp 4 and the capacitor Cr4. In this specification, one LCNL is named as a lamp set, so that the LCNL1–3 is named as a plural regular lamp set 403, as the LCNL4 is named as a regular/emergency lamp set 420 (shown in FIG. 4).

The single-stage ballast system is relatively suitable for regular and emergency lighting applications in offices. The Vac is the utility power, such as the AC power source, coupled to a bridge rectifier 10, then outputs the input power source Vdc to the single-stage converter 20. The input power source Vdc is further in series connected to a storage voltage source VB. The storage voltage source VB is a set of battery connection for power supply storage. When Vac is off, and therefore Vdc is off too, the storage voltage source VB provides the power for the single-stage converter 20. When Vac is normally on, the storage voltage source VB is charged by Vac through the single-stage converter 20 driving.

The single-stage converter 20 can function as a regular ballast, a regular/emergency ballast, a battery charger or discharger, or a power failure detector. When utility power Vac supplies normally, the single-stage converter 20 will function as a charger and regular ballast to have the four lamps for regular lighting. On the contrary, when utility power Vac fails to do so, the battery voltage is boosted by the discharger to a voltage level equivalent to the rectified one. Thus, the electronic ballast achieves the emergency lighting 42 function to turn on one lamp. The microcontroller 30 can differentiate power failure from regular supply to switch operation modes. In practice, the microcontroller 30 is preferably a chip of EM78P458.

Figure 4:
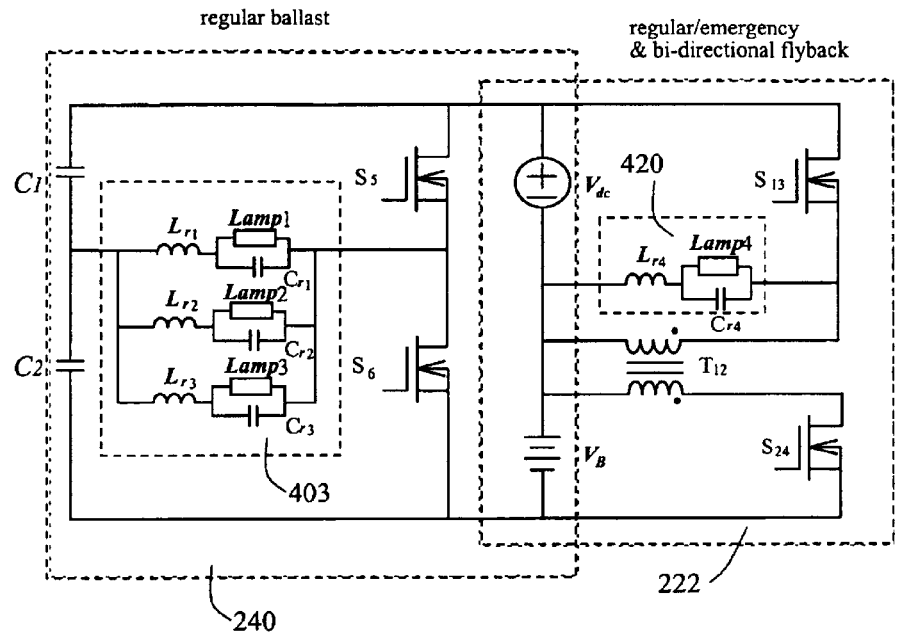
FIG. 4 is a circuit configuration derived from FIG. 2 integrating the bi-direction flyback converter and the regular/emergency ballast.

The proposed single-stage converter 20 of this invention is derived by integrating a bi-directional flyback converter and two half-bridge series-resonant parallel-loaded inverters (SRPLIs). Derivation of the single-stage converter 20 is illustrated in FIG. 4 that is a circuit configuration derived from FIG. 2 and integrates the bi-direction flyback converter 220 and the regular/emergency ballast 200 therein. At first, analyzing the converter shown in FIG. 2 reveals that switches $S_1$ and $S_3$ can be operated synchronously and so do switches $S_2$ and $S_4$. By applying the synchronous switch technique, the flyback converter 220 and the SRPLI 200 shown in FIG. 2 can be integrated into the regular/emergency & bi-direction flyback converter 222, as shown in FIG. 4. That is, the switches $S_1$ and $S_3$ are integrated into a switch $S_{13}$ and the switches $S_2$ and $S_4$ are integrated into a switch $S_{24}$. The switch $S_{24}$ is also to be the second switch of FIG. 5. Similarly, the integrated switch $S_{13}$ and switch $S_5$ of FIG. 4 can be operated synchronously and can be integrated to a third switch $S_{135}$ shown in FIG. 5. Although the second switch $S_{24}$ and the first switch $S_6$ can be integrated to a single one, they are left separately for reducing conduction losses. Thus, the proposed converter topology of the electronic ballast system of this invention becomes the one illustrated in FIG. 5.

Figure 1A:
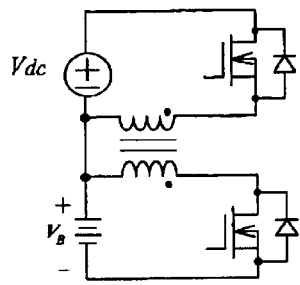
FIG. 1A is a circuit configuration of a conventional bi-direction flyback converter in the prior art.
Figure 1B:
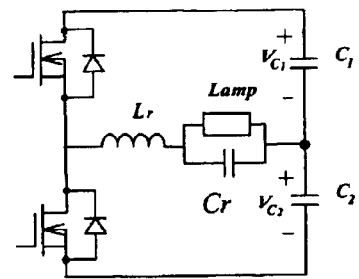
FIG. 1B is a circuit configuration of a conventional half-bridge series resonant parallel-loaded electronic ballast in the prior art.
Figure 5:
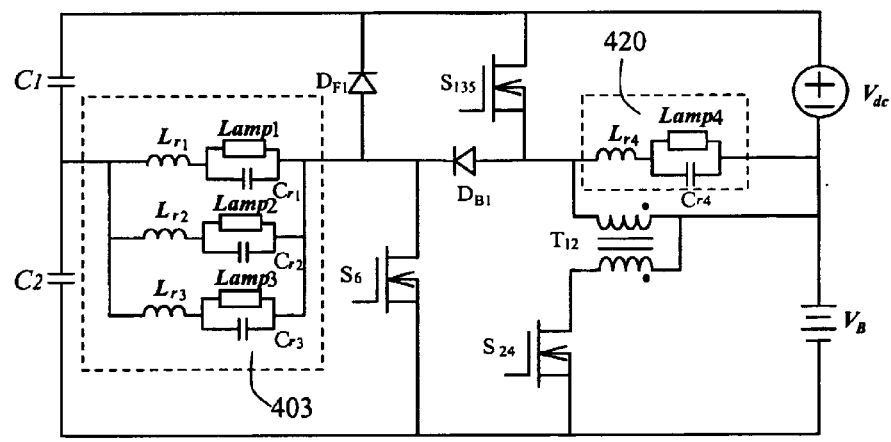
FIG. 5 is a circuit configuration derived from FIG. 4 to further integrate the regular ballast in accordance with the first embodiment of the present invention.

FIG. 5 is a circuit configuration derived from FIG. 4 further integrating the regular ballast 240 with the regular/emergency and bi-direction flyback converter 222 in accordance with the first embodiment of the present invention. The embodiment in FIG. 5 includes an input power source Vdc to provide the electronic ballast system with the power required. The input power source is connected to a storage voltage source VB in series. The storage voltage source VB is consisted of a set of batteries for having the power stored. One end of the storage voltage source VB is connected to ground. Capacitor C1 and C2 are connected in series. One end of the capacitor C1 is connected to the input power source Vdc and one end of capacitor C2 is connected to the ground. The in-series connected capacitors C1 and C2 are necessary elements for SRPLI topology shown as FIG. 1B.

Moreover, FIG. 5 includes a plural regular lamp set 403 for regular lighting and a regular/emergency lamp set 420 for regular/emergency lighting. The plural regular lamp set 403 is connected to capacitors C1 and C2. The regular/emergency lamp set 403 is further connected to the input power source Vdc and the storage voltage source VB. It is obviously different from FIG. 2 that the circuit configuration of FIG. 5 only includes three switching elements, namely the first switch $S_6$, the second switch $S_{24}$, and the third switch $S_{135}$. One end (source or drain) of the first switch $S_6$ is coupled to the plural regular lamp set and the other end (drain or source) is connected to the ground. One end (drain or source) of the second switch $S_{24}$ is connected to the ground, and the other end (source or drain) is connected to a transformer T12. One end (drain or source) of the third switch $S_{135}$ is coupled to the regular/emergency lamp set 420 and the other end (source or drain) is coupled to the input power source Vdc.

The transformer T12 is derived from the transformer T1 and T2 shown in FIG. 2. The transformer T12 has a primary coil coupled to the regular/emergency lamp set 420 and a secondary coil coupled to the second switch $S_{24}$. In addition, one end of the primary coil is connected to the secondary coil and the connection point between the input power source Vdc and the storage voltage source VB. There is a forward diode DF1 and a backward diode DB1 installed in FIG. 5. The forward diode DF1 is employed for rectifying function. One end of DF1 is coupled to the input power source Vdc, the other end thereof is coupled to the plural regular lamp set 403 with the first switch $S_6$. The backward diode DB 1 is for the function of rectifying too. One end of DB1 is coupled to the first switch $S_6$ and the other end is coupled to the third switch $S_{135}$.

As mentioned above, the first switch $S_6$ serves as one switch element of regular ballast for the plural regular lamp set 403. The second switch $S_{24}$ possesses a regular/emergency ballast switch function and a bi-directional flyback converter switch function simultaneously. The third switch $S_{135}$ is to integrate functions of regular/emergency ballast, bi-directional flyback converter and regular ballast at the same time. Normally, the transformer T12 functions as the energy transmission of a bi-directional flyback converter.

It is much of importance to discuss the operating principles of FIG. 5 in according with this invention. The integrated single-stage converter shown in FIG. 5 consists of a flyback semi-stage and two SRPLI semi-stages, in which the flyback semi-stage is operated in the continuous conduction mode and functions as a battery charger or discharger. The half-bridge SRPLI semi-stages are operated above their resonances to drive fluorescent lamps. The converter is operated in two modes, namely the line mode (using the utility power) and the battery mode (using the battery power). In the situation of the line mode, the battery is charged and four lamps are driven by the line source, while in the battery mode, the battery is discharged to supply the single lamp (Lamp4). The transition between these two modes is automatic and instantaneous. This integrated converter is relatively suitable for regular and emergency lighting applications and very cost effective.

When the input power source Vdc normally works, a flyback charger is formed by the third switch $S_{135}$ with the transformer T12. In addition, a regular half-bridge series resonant parallel-loaded electronic ballast is also formed by the first switch $S_6$ with the third switch $S_{135}$ and coupled to the plural regular lamp set 403. Further, another regular half-bridge series resonant parallel-loaded electronic ballast is also formed by the second switch $S_{24}$ with the third switch $S_{135}$ and coupled to the regular/emergency lamp set 420 also.

When the input power source Vdc fails to work normally, the first switch $S_6$ is disabled instantly and automatically due to the connection with the forward diode DF1 and the backward diode DB1. Meanwhile, a flyback discharger is formed due to the connection of the storage voltage source VB with the tansformer T12 and the second switch $S_{24}$. Further, an emergency half-bridge series resonant parallel-loaded electronic ballast is formed due to the connection of the second switch $S_{24}$ with the third switch $S_{135}$ coupled to the regular/emergency lamp set 420. The power source of the present emergency electronic ballast is from the storage voltage source VB.

It is worth pointing out that under normal line supply, the converter functions as a regular electronic ballast, and while the power source fails to work normally, the converter will instantly disable the driving signal of switch $S_6$ without an additional relay and automatically switch to battery mode without any delay.

Figure 6:
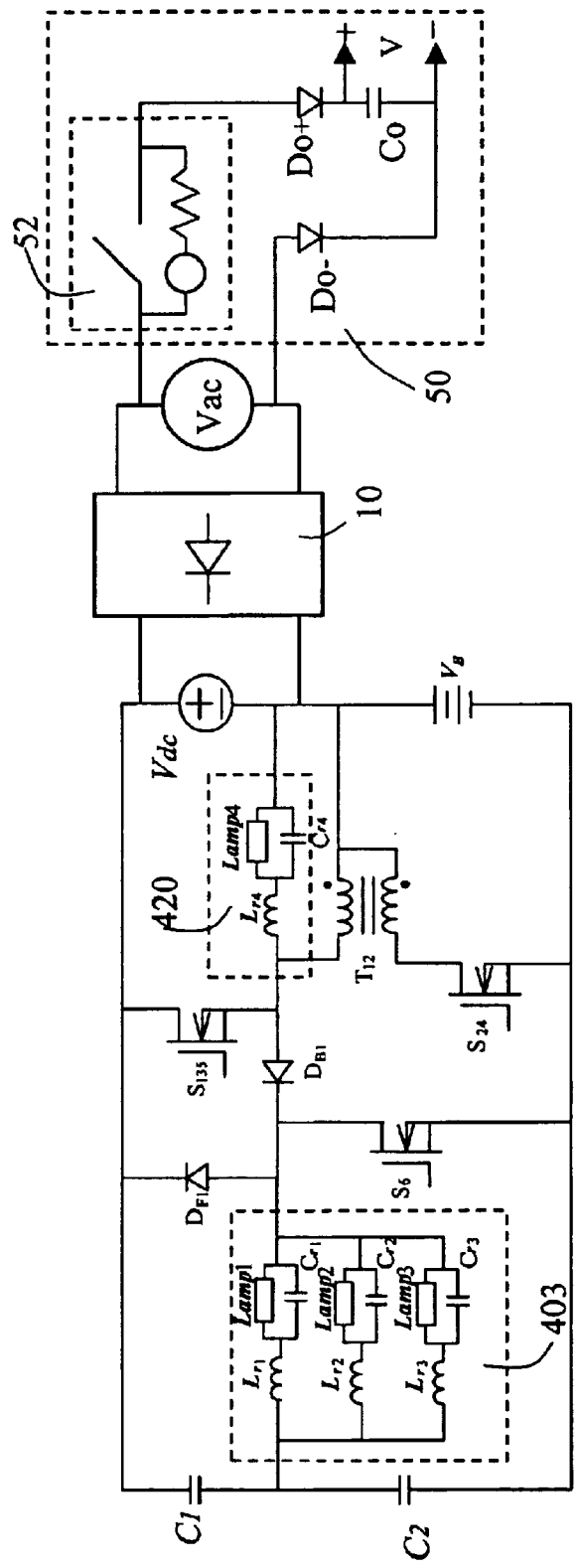
FIG. 6 is a circuit configuration in accordance with the second embodiment of the present invention.

The second embodiment of the present invention is shown as FIG. 6. Comparing with FIG. 5, a detector 50 is installed additionally in FIG. 6 for deciding the plural regular lamp set 403 and/or the regular/emergency lamp set 420 lighting or not. Because the detector 50 needs to connect with AC power source, the utility AC power source Vac and the bridge rectifier 10 are drawn again in FIG. 6 to show the connection with the detector 50. The detector 50 includes a lamp switch 52 coupled to one line of utility AC power source Vac in series connection. There is also an output capacitor Co installed in the detector 50. One end of the capacitor Co is coupled to the lamp switch 52 via a diode Do+ and the other end thereof is coupled to the utility power source via a diode Do−. The voltage of the output capacitor Co is the detective voltage V. In practice, the lamp switch 52 is preferably a popularly-used neon lamp switch.

On the other hand, if no neon lamp switch is employed, resistor with a high resistance parallel connected to an ordinary power source switch is employed. To detect the voltage behind the ordinary power source switch, the method using the high resistance resistor enables the detection of the electronic ballast system saturation of this invention.

The detector 50 is used to differentiate the single-stage system saturation so as to simplify the whole circuit design. There are three modes of system saturation shown as follow:

Mode I: The utility power supply is off, the regular/emergency lamp 4 is lighting by the set of battery power source VB. The regular lamps (lamp 1–3) are off not matter the lamp switch 52 is on or off. The detective voltage is V1.

Mode II: The utility power supply is normally on and the lamp switch is turned off, then all the four lamps are off so that the regular/emergency lamp 4 is off too. The detective voltage is V2.

Mode III: The utility power supply is normally on and the lamp switch is turned on, then all the four lamps are on so that the regular/emergency lamp 4 is on too. The detective voltage is V3.

The detective voltage V will be transmitted to the microcontroller 30, then the microcontroller 30 detects and acknowledges the mode of system saturation to drive the relative switches operated in corresponding modes. The is advantages of the second embodiment are simplifying the circuit connection and detecting, and further replacing the ordinary power source switch by the neon lamp switch but having no in-connection load provided.

Figure 7:
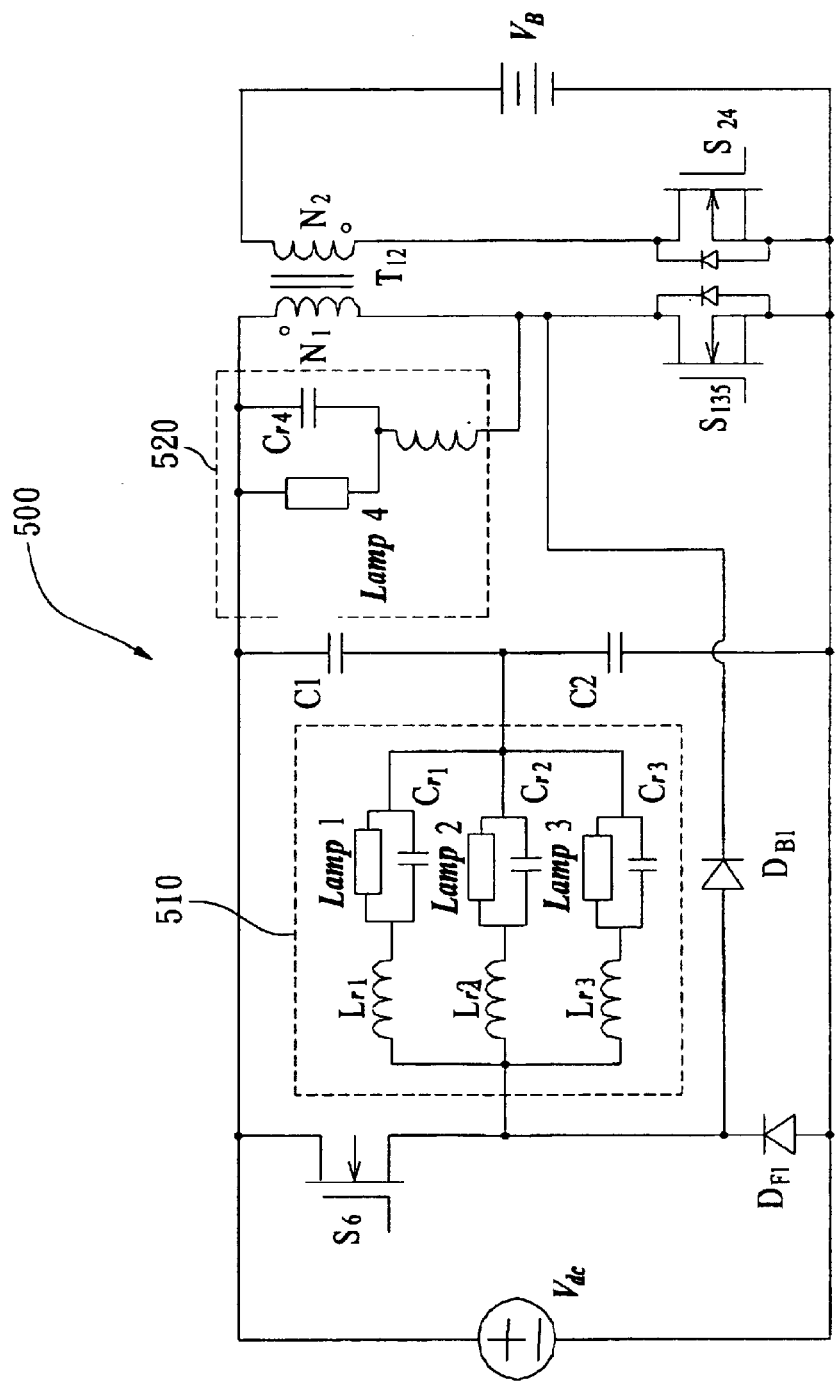
FIG. 7 is a circuit configuration diagram of another embodiment in accordance with the present invention.

Please refer to FIG. 7 of a third embodiment of the present invention.

The third embodiment 500 as well includes a plural regular lamp set 510 and a regular/emergency lamp set 520. As the utility power source supplies normally to this circuit 500, switches $S_{24}$, $S_{135}$ and $S_6$ turn on so as to have all lamps including Lamp 1 to Lamp 4 turn on, as $S_6$ and $S_{24}$ are operated simultaneously; rather, while supply of the utility power source is not as normal, only switches $S_{24}$ and $S_{135}$ are turned on and, in the meanwhile, the switch $S_6$ is off, leading to having only one lamp (emergency lamp-Lamp 4) turned on. FIG. 7 only provides another embodiment according to the present invention, thus the connection relationships between elements, such as the regular lamp set 510, regular/emergency lamp set 520, switches $S_{24}$, $S_{135}$ and $S_6$ and transformer T12 are omitted from this paragraph.

According to the above discussion, the present invention discloses an integrated single-stage electronic ballast system for emergency lighting applications, having the features of battery charging, discharging and regular/emergency ballast, so as to reduce the fabrication cost by simplifying the circuit configuration and reducing the number of employed active switching elements. Further, this invention has been examined to be progressive, advantageous and applicable to the industry.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. An electronic ballast system for emergency lighting applications, comprising:

an input power source for providing the electronic ballast system with power required;

a storage voltage source connected to the input power source in series so as to store the power and having one end thereof connected to ground;

a first capacitor connected to a second capacitor in series, wherein one end of the first capacitor is connected to the input power source and one end of the second capacitor is grounded;

a plural regular lamp set connected to the first capacitor with the second capacitor for regular lighting;

a regular/emergency lamp set connected to the input power source and the storage voltage source for regular or emergency lighting;

a first switch having one end coupled with the plural regular lamp set and the other end connected to ground;

a second switch with one end connected to ground;

a transformer having a primary coil coupled to the regular/emergency lamp set, and a secondary coil coupled to the second switch, wherein one end of the primary coil is connected to the secondary coil;

a third switch with one end coupled to the regular/emergency lamp set and the other end coupled to the input power source;

a forward diode installed for rectifying with one end coupled to the input power source and the other end thereof coupled to the plural regular lamp set with the first switch; and a backward diode for rectifying function with one end coupled to the first switch and the other end coupled to the third switch.

2. The electronic ballast system for emergency lighting applications as recited in claim 1, wherein the first switch serves as one switching element of a regular ballast for the plural regular lamp set.

3. The electronic ballast system for emergency lighting applications as recited in claim 1, wherein the second switch possesses a regular/emergency ballast switch function and a bi-directional flyback converter switch function simultaneously.

4. The electronic ballast system for emergency lighting applications as recited in claim 1, wherein the third switch possesses an integrated switching function of a regular/emergency ballast, a bi-directional flyback converter and a regular ballast at the same time.

5. The electronic ballast system for emergency lighting applications as recited in claim 1, wherein the transformer serves as the energy transmission of a bi directional flyback converter.

6. The electronic ballast system for emergency lighting applications as recited in claim 1, a flyback charger is formed by the third switch with the transformer when the input power source normally works.

7. The electronic ballast system for emergency lighting applications as recited in claim 1, wherein a regular half-bridge series resonant parallel loaded electronic ballast is formed by the first switch with the third switch coupled to the plural regular lamp set when the input power source normally works.

8. The electronic ballast system for emergency lighting applications as recited in claim 1, wherein a regular half-bridge series resonant parallel loaded electronic ballast is formed by the second switch with the third switch coupled to the regular/emergency lamp set when the input power source normally works.

9. The electronic ballast system for emergency lighting applications as recited in claim 1, wherein the first switch is disabled instantly and automatically due to the connection with the forward diode and the backward diode when the input power source fails to work normally.

10. The electronic ballast system for emergency lighting applications as recited in claim 1, wherein a flyback discharger is formed due to the connection of the storage voltage source with the transformer and the second switch when the input power source fails to work normally.

11. The electronic ballast system for emergency lighting applications as recited in claim 1, wherein an emergency half-bridge series resonant parallel loaded electronic ballast is formed due to the connection of the second switch with the third switch coupled to the regular/emergency lamp set when the input power source fails to work normally, and the power source of the emergency electronic ballast is from the storage voltage source.

12. An electronic ballast system for emergency lighting applications, comprising:

an utility power source rectified by a bridge rectifier to output a DC input power source to provide the electronic ballast system with power required;

a storage voltage source connected to the input power source in series so as to store the power and having one end thereof grounded;

a first capacitor connected to a second capacitor in series, wherein one end of the first capacitor is connected to the input power source and one end of the second capacitor is grounded; a plural regular lamp set connected to the first capacitor and the second capacitor for regular lighting;

a regular/emergency lamp set connected to the input power source and the storage voltage source for regular or emergency lighting;

a first switch having one end coupled with the plural regular lamp set and the other end grounded;

a second switch with one end connected to ground;

a transformer having a primary coil coupled to the regular/emergency lamp set and a secondary coil coupled to the second switch, wherein one end of the primary coil is connected to the secondary coil;

a third switch with one end coupled to the regular/emergency lamp set and the other end coupled to the input power source;

a forward diode installed for rectifying with one end coupled to the input power source and the other end coupled to the plural regular lamp set and the first switch;

a backward diode for rectifying with one end coupled to the first switch and the other end coupled to the third switch; and a detector coupled to the utility power source for outputting a detective voltage so as to decide the plural regular lamp set or the regular/emergency lamp set is lighting or not.

13. The electronic ballast system for emergency lighting applications as recited in claim 12, wherein the detector includes:

a lamp switch coupled to one line of the utility power source; and an output capacitor with one end coupled to the lamp switch via a diode and the other end coupled to the utility power source via another diode, wherein the voltage of the output capacitor is a detective voltage.

14. The electronic ballast system for emergency lighting applications as recited in claim 13, wherein if the utility power source fails to normally provide the power, the regular/emergency lamp set is lighting by the storage voltage source and the plural regular lamp set is lighting off;

if the utility power source is normally on and the lamp switch is turned off, the regular/emergency lamp set and the plural regular lamp set are lighting off; and if the utility power source is normally on and the lamp switch is turned on, the regular/emergency lamp set and the plural regular lamp set are lighting on.

* * * * *